Figure 1:
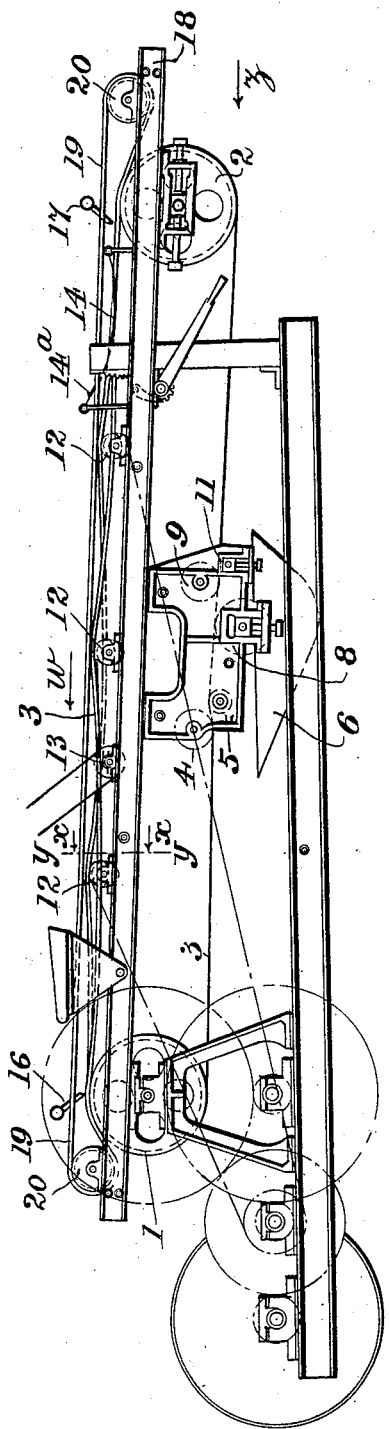

J. D. WOLF.
PROCESS FOR SEPARATING METALS FROM THEIR ORES.
APPLICATION FILED OCT. 4, 1906.

899,478.

Patented Sept. 22, 1908.
6 SHEETS—SHEET 1.

Witnesses
W. Max Duvall
Myron F. Clear

Inventor,
J. D. Wolf
by Wilkinson & Fisher.
Attorneys.

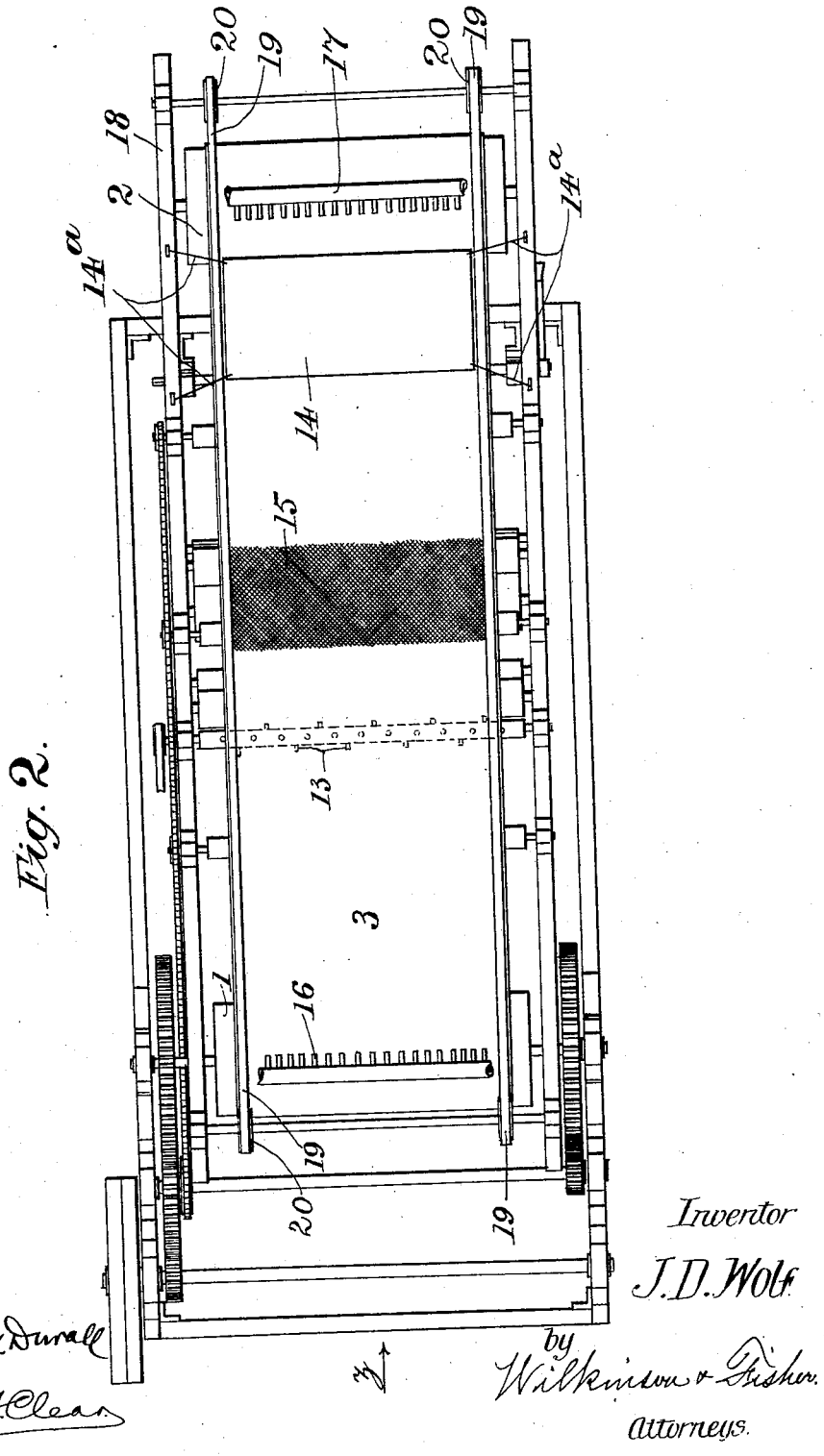

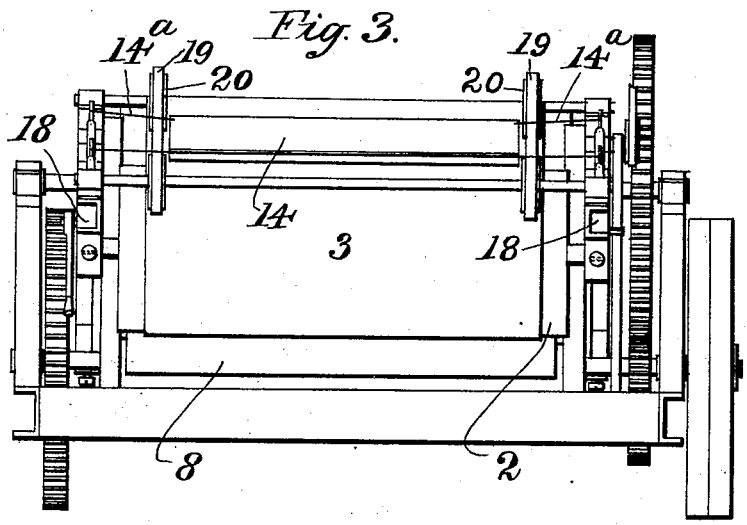
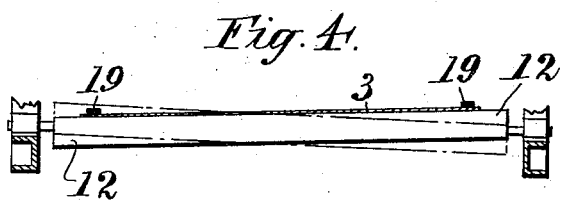
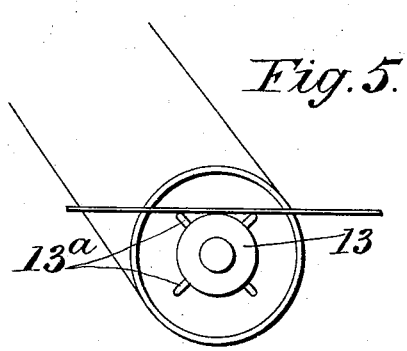

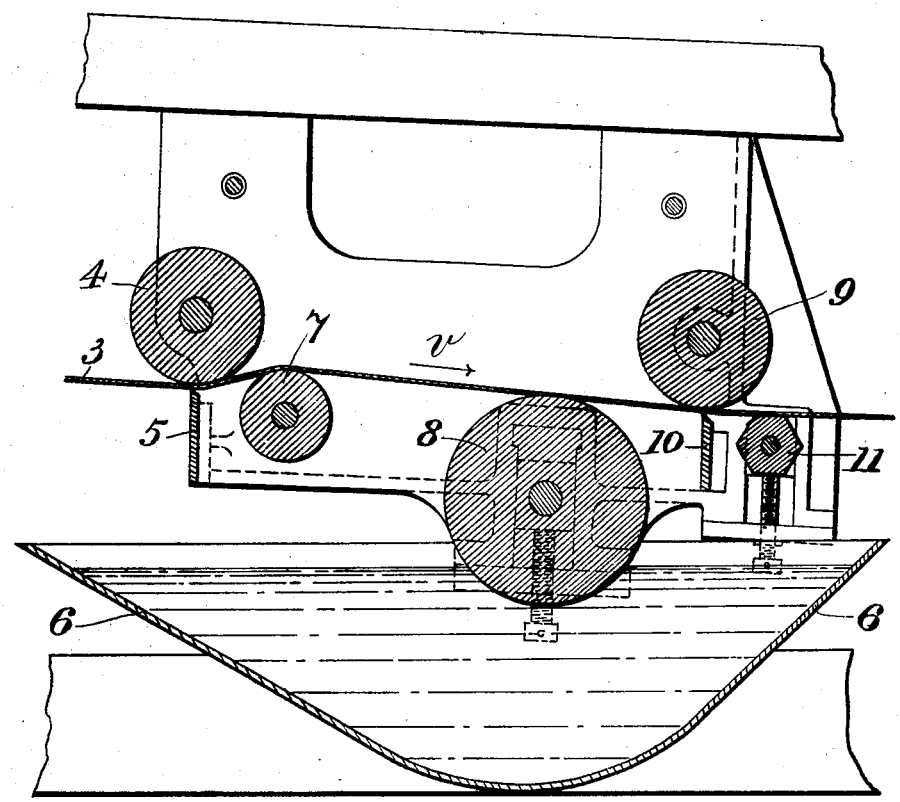

J. D. WOLF.
PROCESS FOR SEPARATING METALS FROM THEIR ORES.
APPLICATION FILED OCT. 4, 1906.

899,478.

Patented Sept. 22, 1908.

Fig. 7.

Witnesses.
W. May. Duvall
Myron J. Clear

Inventor
J. D. Wolf
by Wilkinson & Fisher
Attorneys.

J. D. WOLF.
PROCESS FOR SEPARATING METALS FROM THEIR ORES.
APPLICATION FILED OCT. 4, 1906.

899,478.

Patented Sept. 22, 1908.
6 SHEETS—SHEET 6.

UNITED STATES PATENT OFFICE.

JACOB DAVID WOLF, OF LONDON, ENGLAND.

PROCESS FOR SEPARATING METALS FROM THEIR ORES.

No. 899,478.    Specification of Letters Patent.    Patented Sept. 22, 1908.

Original application filed July 7, 1905, Serial No. 268,611. Divided and this application filed October 4, 1906.
Serial No. 337,445.

*To all whom it may concern:*

Be it known that I, JACOB DAVID WOLF, gentleman, a citizen of the United States of America, residing at 17 Throgmorton avenue, in the city of London, England, have invented certain new and useful Improvements in Processes for Separating Metals from Their Ores, of which the following is a specification.

This invention relates to improvements in processes for separating metals from their ores, the present application being a divisional application covering subject matter originally described and claimed in my application for process and apparatus for the separation of metals from their ores, filed July 7, 1905, Serial No. 268,611.

As in my former application the present process has for its object the separation of metals from their ores by the employment of oil or grease and especially oil or grease having a high degree of viscosity and cohesion or in which a high degree of viscosity and cohesion has been produced. For example I may employ oil or grease which has been prepared or treated with chlorid of sulfur or other suitable material or treatment to alter the physical characteristics of the oil or grease or otherwise render same suitable for use in conjunction with apparatus according to my present invention for separating metals from their ores.

By the terms oil or grease I mean and intend to include herein any oil or grease or any oleaginous substance or compound that can or may be employed in carrying out my present invention and which will act or exert such action on the metals to be separated as will be produced thereon by oil or grease having a high degree of viscosity and cohesion which has been imparted thereto say by specially preparing or treating heavy hydrocarbon oils with chlorid of sulfur in the now well-known manner—or I may employ other mineral oils such as heavy tar oils or residual oils—or I may employ any other oils as desired whether animal vegetable or mineral oils or greases or fish oils provided same are suitable for my purpose, *i. e.* are either of themselves of suitable viscosity density and cohesion, or are capable of having sufficient viscosity and cohesion artificially imparted thereto; all of which oils greases or oleaginous substances or the like I will for the sake of brevity hereinafter refer to as "oil."

The present invention consists of a new or improved method as herein described of separating metals from their ores such method consisting in passing the ore to be treated in a finely divided condition in conjunction with water as a wet pulp over an endless traveling belt coated with an adhesive substance or compound as aforesaid adapted to cause the mineral particles to adhere thereto for which purpose the surface of said layer or coating may be arranged or rendered other than smooth and imparting eddies or swirls or otherwise interrupting the regular flow of the wet pulp as it passes over said coated belt or imparting a vertical tapping movement to that part of the belt on which the wet pulp is supported and subsequently removing from said belt said coating of adhesive substance with any metallic particles adhering thereto or mingled therewith, separating said mineral particles in any suitable manner from the said coating substance or compound and re-coating the belt during its continuous travel as aforesaid or if desired the step of arranging and rendering the surface of said layer or coating otherwise than smooth may be omitted.

In the accompanying drawings I have illustrated apparatus for separating metals from their ores in accordance with the present invention.

Figure 8:
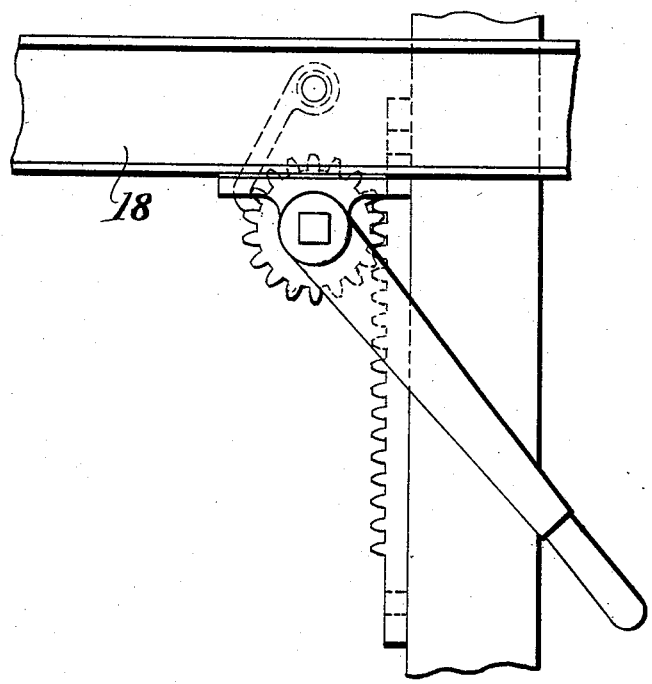

Figure 1 is side view in elevation of a complete apparatus according to my present invention. Fig. 2 is a plan of Fig. 1. Fig. 3 is an end view looking in the direction of the arrow $z$ Figs. 1 and 2. Fig. 4 is a detail elevational view on the line $y$—$y$ looking in the direction of the arrow $x$ Fig. 1 of one form of roller *i. e.* a cam roller or eccentric roller for raising and lowering the belt at different points transversely as said belt passes over said roller. Fig. 5 is a detail elevational view on an enlarged scale of another form of roller for imparting shaking or vertical movement to the endless traveling belt as it passes over said roller. Fig. 6 is a detail vertical sectional view on an enlarged scale of the belt scraping and belt re-oiling device and bath holding the supply of said oil. Fig. 7 is a similar view to Fig. 6 only showing modified arrangement and construction of the bath or holder for the oil (or other tacky substance to be applied to the belt) namely a separate holder for the oil before it has been applied to the traveling belt and a separate holder for the oil after same has been removed from the belt with any metallic mineral therein. Fig. 8 is a local view on an enlarged scale showing suitable means for elevating or lowering one end of the table or frame carrying the endless traveling belt.

1 is main roller at the higher end of the table and 2 is main roller at the lower end of the table (illustrated in Fig. 1) hereinafter referred to as the main rollers 1 and 2.

3 is the endless belt (advantageously made of canvas) traveling in the direction of the arrow $w$ Fig. 1; which belt passes round the main roller 1 thence along under the roller 4 which keeps said belt 3 pressed down against the scraper blade 5 (see Figs. 1 and 7) by which latter the oil on the surface of said belt 3 (or any desired portion thereof) is scraped off and drops into the oil reservoir or tank 6 which in the case illustrated in Figs. 1 and 6 is the oil bath from which the belt is re-oiled or in the arrangement shown in Fig. 7 this tank or oil receptacle 6 is a separate receptacle which receives therein such scraped off oil—as hereinafter explained while the fresh oil supply for spreading on the belt is taken from another and separate receptacle $6^x$ having no connection with the receptacle 6 so that by this arrangement in Fig. 7 the belt is oiled from the bath of fresh oil only in the chamber $6^x$ while the mineralized oil scraped off the belt by the scraper 5 is passed into another and separate receptacle entirely.

Either the scraper 5 or roller 4 above same may be made adjustable vertically or otherwise so as to put more or less pressure from the scraper 5 upon the belt 3 or from the belt 3 upon the scraper. After passing the scraper 5 the belt passes on (advantageously over a roller 7) in the direction of the arrow $v$ and the outside of said belt 3 (which is now the underside) then makes contact with the oiling roller 8 which is partly immersed in the oil in the oil bath 6 or $6^x$; said oiling roller 8 advantageously being vertically adjustable in its bearings as for example by means of adjustable bearings as indicated in dotted lines in Figs. 6 and 7. The belt 3 after passing the oiling roller 8 and having been thoroughly oiled then passes under the roller 9 (or the latter may be dispensed with) and over the doctor or scraper 10 which latter is advantageously adjustable so that any desired amount of the oil spread on the belt by the roller 8 can be scraped off by the doctor or scraper 10 i. e. so that exactly the desired thickness or quantity of oil required on the belt can be left thereon. After passing the scraper 10 the belt next passes over the polygonal roller 11 (Fig. 6) which may advantageously be an octagonal or hexagonal roller as illustrated; said polygonal roller 11 being adjustable so as to be forced with the desired amount of pressure against the oiled surface of the belt 3 as it passes said roller which latter is thereby rotated or may be independently (i. e. mechanically) rotated so that as each flat side of said roller 11 moves away from the belt 3 to which it tends to stick thereby the oil surface is abraded or rendered ragged or uneven by the drawing apart of the oil surface and roller surface thus forming a roughened or uneven oil surface very suitable for my purpose namely so as to present as much oil surface to the materials (metallic minerals etc.) which later on are passed over same. Or in place of the polygonal sided roller 11 I may employ a fluted roll (either with or without the doctor or scraper 10) such for instance as the fluted roller $11^a$ shown in Fig. 7 whereby any surplus oil can be squeezed off the belt and the surface of the oil layer fluted and corrugated or otherwise roughened for the aforesaid purposes. Or if desired I may use other similar devices for the aforesaid purpose. The belt having been thus oiled then passes on round the lower main roller 2 and over any desired number of wabbling rolls 12 (see Fig. 4) three such rolls being shown in Fig. 1 or the belt 3 passes over one or more tapping rolls 13 (see Fig. 5) which are provided with a number of radial arms $13^a$ which impart a rapid vertical vibratory action or tapping on the underside of the belt which serves to assist in bringing the mineral particles in contact with the oil on the belt.

Over the top of the belt I arrange one or more aprons 14 which may be of matting or canvas etc. which is secured over the belt for example by the strings $14^a$ as shown in the drawings in suchwise that the underside of each apron or matting 14 will lie in the path of travel of the wet pulp flowing along the belt 3 with the result that the mineral particles of the wet pulp will thereby be thoroughly brought into contact with the oil on the belt. Or in place of or in addition to the aforesaid apron 14 of flexible material I may use any other suitable material such for example as a wire gauze or grid 15 as indicated in Fig. 2. In addition to the water spray or water supply employed at the upper end of the belt I also find it advantageous to employ another water spray 17 at the lower end of the belt in or about the position shown in Fig. 2 with the water directed against the flow of the wet pulp along the belt 3.

Fig. 8 is an enlarged view of the rack and pinion arrangement by which that end of the frame 18 which carries the lower main roller 2 can be raised and lowered by means of a rack and pinion motion as indicated in this figure and Figs. 1 and 2.

The various moving parts of the machine are driven by any suitable means such as by belt and spur gearing as indicated in the drawings as will be readily understood and which driving mechanism need not therefore be here further described.

An edging is provided along each side edge of the belt so as to prevent the wet pulp from flowing off the belt laterally such edging either being provided on the belt itself or this edging may be formed and arranged to act as indicated in the drawings namely by means of two separate edging belts 19 passing round pulleys 20 at each end of the machine so that as the belt 3 passes along the upper part of the table these edging belts form raised edges 19 to said belt 3 (see Fig. 4) and thereby prevent the wet pulp flowing off the same laterally.

By the present invention sizing (which is so very necessary to concentrating by gravity) is practically unnecessary; there is little or no loss of oil; and the quantity of oil in use is very small.

This process does not depend on the flotation power (which is not very great) of the oil as in "oil processes" heretofore suggested for the separation of metals from their ores.

What I claim is:—

1. The herein described method of separating metals from their ores which consists in forming a pulp; passing said pulp containing the metals over an oily adhesive substance; and in abrading the surface of said substance by drawing apart the body of the same, and thereby causing some of the mineral particles to adhere thereto, substantially as described.

2. The herein described method of separating metals from their ores which consists in finely dividing the ore, then passing it in its finely divided condition under a water supply, whereby a wet pulp is formed, subjecting the said pulp to the action of a traveling oily adhesive substance, thereby causing some of the mineral particles to adhere thereto, then roughening the adhesive surface, imparting eddies or swirls to said traveling substance and therethrough to said pulp, and thereby interrupting the regular flow of the same and causing other particles to adhere to said oily substance while the said pulp is traveling along with the said substance, then collecting the said oily substance with the mineral particles that have adhered thereto, and then separating said mineral particles from said substance, substantially as described.

3. The herein described method of separating metals from their ores which consists in finely dividing the ore, then passing it in its finely divided condition under a water supply, whereby a wet pulp is formed, subjecting the said pulp to the action of a traveling oily adhesive substance, thereby causing some of the mineral particles to adhere thereto, then imparting eddies or swirls to said traveling substance and therethrough to said pulp, and thereby interrupting the regular flow of the same and causing other particles to adhere to said oily substance while the said pulp is traveling along with the said substance, then collecting the said oily substance with the mineral particles that have adhered thereto, then separating said mineral particles from said substance and finally resupplying said substance for contact with fresh ore, substantially as described.

4. The herein described method of separating metals from their ores, which consists in finely dividing said ore, then passing it in its finely divided condition into contact with a supply of water, whereby a wet pulp is formed, subjecting the said pulp to the action of a rough surfaced oily substance, causing the said surface and the said ore to travel along, and while so traveling imparting eddies or swirls to the said surface and pulp and thereby interrupting its regular flow, and causing additional particles of the same to come into contact with the said rough surfaced oily substance, then collecting the said substance along with any mineral particles that might adhere thereto, and finally resupplying the said substance for contact with fresh ore, substantially as described.

5. The herein described method of separating metals from their ores which consists in finely dividing said ore, then subjecting it in its finely divided condition to a source of water supply whereby a wet pulp is formed, then subjecting the said pulp to the action of a traveling roughened surfaced oily substance whereby the sticking of the mineral particles of the said ore to the said substance is facilitated, continually automatically roughening the surface of said oily surface, and subjecting the said pulp to the action of eddies or swirls whereby additional mineral particles are caught by said oily substance, substantially as described.

6. The method of separating metals from their ores which consists in finely dividing the ore, then subjecting it in its finely divided condition to the action of water, whereby a wet pulp is formed, subjecting the said pulp to the action of a traveling rough surfaced oily substance, consisting of a heavy hydrocarbon oil treated with a chlorid of sulfur continually abrading or roughening the surface of said oily substance, continually subjecting the said ore to eddies or swirls and thereby causing additional particles to stick to said surface, collecting said substance and any mineral particles that may be adhering thereto, and separating said mineral particles from said substance, substantially as described.

In witness whereof I have hereunto set my hand in presence of two witnesses.

JACOB DAVID WOLF.

Witnesses:
  R. WESTACOTT,
  FREDK. L. RAND.